United States Patent
Haga et al.

(10) Patent No.: US 7,928,682 B2
(45) Date of Patent: Apr. 19, 2011

(54) NUMERICAL CONTROLLER HAVING AXIS RECONFIGURATION FUNCTION

(75) Inventors: Makoto Haga, Minamitsuru-gun (JP); Masahiko Hosokawa, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 12/646,235

(22) Filed: Dec. 23, 2009

(65) Prior Publication Data

US 2010/0231157 A1 Sep. 16, 2010

(30) Foreign Application Priority Data

Mar. 11, 2009 (JP) ................................. 2009-057550

(51) Int. Cl.
G05B 19/25 (2006.01)
(52) U.S. Cl. ...................... 318/570; 318/625; 318/591
(58) Field of Classification Search .................. 318/570, 318/625, 591, 600, 569, 567, 571, 568.22; 700/170
See application file for complete search history.

(56) References Cited

U.S. PATENT DOCUMENTS

2009/0230910 A1* 9/2009 Hishikawa et al. ........... 318/591
2010/0185316 A1   7/2010 Yamada

FOREIGN PATENT DOCUMENTS

| JP | 3-36606 | 2/1991 |
|----|---------|--------|
| JP | 7-93015 | 4/1995 |
| JP | 10-11120 | 1/1998 |
| JP | 3199319 | 6/2001 |
| WO | 2008/136110 | 11/2008 |

OTHER PUBLICATIONS

Japanese Notice of Reasons for Rejection mailed Jul. 13, 2010 issued in Japanese Application No. 2009-057550 (including a translation thereof).

* cited by examiner

*Primary Examiner* — Karen Masih
(74) *Attorney, Agent, or Firm* — Drinker Biddle & Reath LLP

(57) ABSTRACT

A numerical controller capable of performing axis reconfiguration of control axes in at least two paths without need for the paths to wait. A program block is read and it is determined whether or not the read block includes an axis detachment command. If the block includes the axis detachment command block, an action axis attribute of an control axis designated by the axis detachment command is altered to a non-action axis attribute. Further, if the read block includes an axis allocation command, it is determined whether or not an control axis designated by the axis allocation command becomes a non-action axis, and when the control axis has the non-action axis attribute, the non-action axis attribute of the control axis is altered to a designated path's action axis attribute. Thus, the axis reconfiguration processing in one path can be performed separately from axis reconfiguration processing in another path.

3 Claims, 16 Drawing Sheets

FIG.3a

DESIGNATED PATH'S ACTION AXIS
ATTRIBUTES IN 1ST PATH

X(ATTRIBUTE 0101, I.D. NO. 001)

Y(ATTRIBUTE 0102, I.D. NO. 002)

Z(ATTRIBUTE 0103, I.D. NO. 003)

C(ATTRIBUTE 0104, I.D. NO. 004)

FIG.3b

NON-ACTION AXIS ATTRIBUTES

NO RELEVANT AXIS

FIG.3c

DESIGNATED PATH'S ACTION AXIS
ATTRIBUTES IN 2ND PATH

X(ATTRIBUTE 0201, I.D. NO. 005)

Y(ATTRIBUTE 0202, I.D. NO. 006)

Z(ATTRIBUTE 0203, I.D. NO. 007)

FIG.4a

DESIGNATED PATH'S ACTION AXIS
ATTRIBUTES IN 1ST PATH

X(ATTRIBUTE 0101, I.D. NO. 001)

Y(ATTRIBUTE 0102, I.D. NO. 002)

Z(ATTRIBUTE 0103, I.D. NO. 003)

FIG.4b

NON-ACTION AXIS ATTRIBUTES

C(ATTRIBUTE 0000, I.D. NO. 004)

FIG.4c

DESIGNATED PATH'S ACTION AXIS
ATTRIBUTES IN 2ND PATH

X(ATTRIBUTE 0201, I.D. NO. 005)

Y(ATTRIBUTE 0202, I.D. NO. 006)

Z(ATTRIBUTE 0203, I.D. NO. 007)

FIG.5a

DESIGNATED PATH'S ACTION AXIS
ATTRIBUTES IN 1ST PATH

X(ATTRIBUTE 0101, I.D. NO. 001)

Y(ATTRIBUTE 0102, I.D. NO. 002)

Z(ATTRIBUTE 0103, I.D. NO. 003)

FIG.5b

NON-ACTION AXIS ATTRIBUTES
NO RELEVANT AXIS

FIG.5c

DESIGNATED PATH'S ACTION AXIS
ATTRIBUTES IN 2ND PATH

X(ATTRIBUTE 0201, I.D. NO. 005)

Y(ATTRIBUTE 0202, I.D. NO. 006)

Z(ATTRIBUTE 0203, I.D. NO. 007)

C(ATTRIBUTE 0204, I.D. NO. 004)

FIG.6a

DESIGNATED PATH'S ACTION AXIS
ATTRIBUTES IN 1ST PATH

X (ATTRIBUTE 0101, I.D. NO. 001)

Y (ATTRIBUTE 0102, I.D. NO. 002)

Z (ATTRIBUTE 0103, I.D. NO. 003)

C (ATTRIBUTE 0104, I.D. NO. 004)

FIG.6b

DESIGNATED PATH'S ACTION AXIS
ATTRIBUTES IN 2ND PATH

X (ATTRIBUTE 0201, I.D. NO. 005)

Y (ATTRIBUTE 0202, I.D. NO. 006)

Z (ATTRIBUTE 0203, I.D. NO. 007)

FIG.7a

DESIGNATED PATH'S ACTION AXIS
ATTRIBUTES IN 1ST PATH

X(ATTRIBUTE 0101, I.D. NO. 001)

Y(ATTRIBUTE 0102, I.D. NO. 002)

Z(ATTRIBUTE 0103, I.D. NO. 003)

FIG.7b

DESIGNATED PATH'S ACTION AXIS
ATTRIBUTES IN 2ND PATH

X(ATTRIBUTE 0201, I.D. NO. 005)

Y(ATTRIBUTE 0202, I.D. NO. 006)

Z(ATTRIBUTE 0203, I.D. NO. 007)

C(ATTRIBUTE 0204, I.D. NO. 004)

FIG.8a

DESIGNATED PATH'S ACTION AXIS
ATTRIBUTES IN 1ST PATH

X(ATTRIBUTE 0101, I.D. NO. 001)

Y(ATTRIBUTE 0102, I.D. NO. 002)

Z(ATTRIBUTE 0103, I.D. NO. 003)

FIG.8b

DESIGNATED PATH'S ACTION AXIS
ATTRIBUTES IN 2ND PATH

X(ATTRIBUTE 0201, I.D. NO. 005)

Y(ATTRIBUTE 0202, I.D. NO. 006)

Z(ATTRIBUTE 0203, I.D. NO. 007)

C(ATTRIBUTE 0204, I.D. NO. 004)

FIG.9a

DESIGNATED PATH'S ACTION AXIS
ATTRIBUTES IN 1ST PATH

X (ATTRIBUTE 0101, I.D. NO. 001)

Z (ATTRIBUTE 0102, I.D. NO. 002)

C (ATTRIBUTE 0103, I.D. NO. 003)

FIG.9b

DESIGNATED PATH'S ACTION AXIS
ATTRIBUTES IN 2ND PATH

Y (ATTRIBUTE 0201, I.D. NO. 004)

Z (ATTRIBUTE 0202, I.D. NO. 005)

C (ATTRIBUTE 0204, I.D. NO. 006)

FIG.10a

DESIGNATED PATH'S ACTION AXIS
ATTRIBUTES IN 1ST PATH

Y (ATTRIBUTE 0101, I.D. NO. 004)

Z (ATTRIBUTE 0102, I.D. NO. 002)

C (ATTRIBUTE 0103, I.D. NO. 003)

FIG.10b

DESIGNATED PATH'S ACTION AXIS
ATTRIBUTES IN 2ND PATH

X (ATTRIBUTE 0201, I.D. NO. 001)

Z (ATTRIBUTE 0202, I.D. NO. 005)

C (ATTRIBUTE 0204, I.D. NO. 006)

NUMERICAL CONTROLLER HAVING AXIS RECONFIGURATION FUNCTION

RELATED APPLICATION DATA

This application claims priority under 35 U.S.C. §119 and/or §365 to Japanese Application No. 2009-057550 filed Mar. 11, 2009, the entire contents of which are incorporated herein by reference.

BACKGROUND OF THE INVENTION

1. Field of the Invention

The present invention relates to a numerical controller for controlling a plurality of paths, and more particularly to a numerical controller having an axis reconfiguration function between the paths.

2. Description of Related Art

In a multi-path numerical controller having at least two paths, there has been known a technique for moving or exchanging axis control between the paths, to thereby reconfigure axes belonging to the paths for improvement of machining efficiency. This technique is disclosed in, e.g., JP 3199319B.

Another technique relating to a numerical controller has been known, in which axis control right for each individual path is changeably set by a flexible path axis assignment command in a machining program, and an axis-related configuration is stored, which indicates axis addresses of respective paths at the time of flexible path axis assignment being commanded. When a command is given for returning the control right to the path before flexible path axis assignment, the control right is returned to the path before flexible path axis assignment based on the axis-related configuration. This technique is disclosed in JP 10-11120A.

To implement axis exchange between paths, a conventional numerical controller with interpath axis reconfiguration function generates a waiting command (other than the axis exchange command) for relevant paths to create a state where execution of programs is stopped in these path, and executes the axis exchange command in that state to implement axis reconfiguration. Thus, a problem is posed that the machining cycle time is lengthened by the time required for execution of the waiting command. Similarly, when an axis motion command is given, an axis motion process is executed while the waiting command is being implemented in relevant paths, thus posing the problem that the machining cycle time becomes long.

Such machine adapted to implement the axis reconfiguration is mostly applied to a machine for mass production of precise workpieces, which is called automatic machine. In the case of a method for cutting precise workpieces by giving an instruction consisting of a set of a waiting command and an axis reconfiguration command, the waiting command is a redundant command. Specifically, if the waiting command requires 16 msec to complete and the combinatorial command consisting of the waiting command and the axis reconfiguration command is given four times in the program, the dead time of 64 msec is exhausted for each precise workpiece. To cut ten thousand precise workpieces, the dead time of (64 msec×10000 pieces)/1000 msec=640 seconds is exhausted.

The technique disclosed in JP 10-11120A is a technique in which predetermined processing is implemented after exchange of axis control, a state of a flexible path axis assignment inhibition flag, which represents whether axis control exchange can be made upon restoration to the previous axis configuration, is determined, and based on the flag state, the axis exchange is prohibited or waiting is made until the prohibited state is canceled. However, to cancel the prohibited state, another command (i.e., a flexible path axis assignment restoration prohibition canceling command) must be given, which poses a problem that the machining cycle time becomes long and the machining cycle time related to the axis exchange command cannot be shortened.

SUMMARY OF THE INVENTION

The present invention provides a numerical controller having at least two paths which is capable of performing axis reconfiguration processing in one path separately from axis reconfiguration processing in another path, and provides a numerical controller having at least two paths which is capable of performing axis reconfiguration processing in the paths without wait between the paths.

The numerical controller of the present invention has at least two paths for controlling control axes and has a function of altering an axis configuration of the control axes in the paths according to commands in programs respective for the paths. According to one aspect of the present invention, the numerical controller comprises: control axis attribute storage means arranged to store attributes of the control axis to be a designated path's action axis attribute for a control axis belonging to and being operable in any of the paths, and to be a non-action axis attribute for a control axis not belonging to any of the paths; determining means arranged to analyze a block of the program for one of the paths to determine whether or not the block includes a control axis detachment command for commanding detachment of control of a control axis from the one of the paths; and non-action axis attribute alteration means arranged to alter the action axis attribute of the control axis designated by the control axis detachment command to the non-action axis attribute and store the non-action axis attribute of the control axis in the control axis attribute storage means when it is determined that the block includes the control axis detachment command by the determining means.

According to another aspect of the present invention, the numerical controller comprises: control-axis attribute storage means arranged to store attributes of the control axes to be a designated path's action axis attribute for a control axis belonging to and being operable in any of the paths, and to be a non-action axis attribute for a control axis not belonging to any of the paths;

determining means arranged to analyze a block of the program for one of the paths to determine whether or not the block includes an axis allocation command for allocating control of a control axis in the one of the paths;

non-action axis attribute determining means arranged to determine whether or not the control axis designated by the axis allocation command has the non-action axis attribute; and designated path's action axis attribute alteration means arranged to alter the non-action axis attribute of the control axis designated by the axis allocation command to the designated path's action axis attribute in the one of the paths, and store the designated path's action axis attribute of the control axis in the control axis attribute storage means when it is determined that the block includes the allocation command and it is determined that the control axis has the non-action axis attribute.

According to still another aspect of the present invention, the numerical controller comprises: control-axis attribute storage means arranged to store attributes of the control axes to be a designated path's action axis attribute for a control axis belonging to and being operable in one of the paths, and to be a non-action axis attribute for a control axis not belonging to any of the paths;

determining means arranged to analyze a block in the program for one of the paths and determine whether the block includes an axis exchange command for exchanging control of a first control axis of own path and control of a second control axis of other path; non-action axis attribute alteration means arranged to alter the action axis attribute of the first control axis in the own path to the non-action axis attribute, and store the non-action axis attribute of the first control axis in the control axis attribute storage means when it is determined that the block includes the control axes exchange command; non-action axis attribute determining means arranged to determine whether or not the second control axis designated by the axis exchange command has the non-action axis attribute; and designated path's action axis attribute alteration means arranged to alter the non-action axis attribute of the second control axis to the designated path's control axis attribute in the own path, and store the designated path's control axis attribute of the second control axis in the control axis attribute storage means when it is determined that the second control axis has the non-action axis attribute.

With the present invention, it is possible to provide a numerical controller having at least two paths and able to implement axis reconfiguration for axes belonging to each path separately from processing for axis reconfiguration for other path. It is also possible to provide a numerical controller having at least two paths and capable of implementing axis reconfiguration for axes belonging to each path without the need for the paths to wait.

BRIEF DESCRIPTION OF THE DRAWINGS

FIGS. 3a to 3c are views for explaining axis configurations of first and second paths in initial states;

FIGS. 4a to 4c are views for explaining axis configurations in a case where an axis detachment command is executed for a C-axis of the first path;

FIGS. 5a to 5c are views for explaining axis configurations in a case where an axis allocation command is executed for the C-axis by the second path;

FIGS. 6a to 6b are views for explaining axis configurations of the first and second paths which are in initial states;

FIGS. 7a and 7b are views for explaining axis configurations of the first and second paths, which are altered without making a wait at the time of allocation;

FIGS. 8a and 8b are views for explaining axis configurations of the first and second paths, which are altered by making a wait at the time of allocation;

FIGS. 9a and 9b are views for explaining axis configurations of the first and second paths before execution of an axis exchange command;

FIGS. 10a and 10b are views for explaining axis configurations of the first and second paths, which are obtained by executing an axis exchange command;

DETAILED DESCRIPTION

Figure 1:
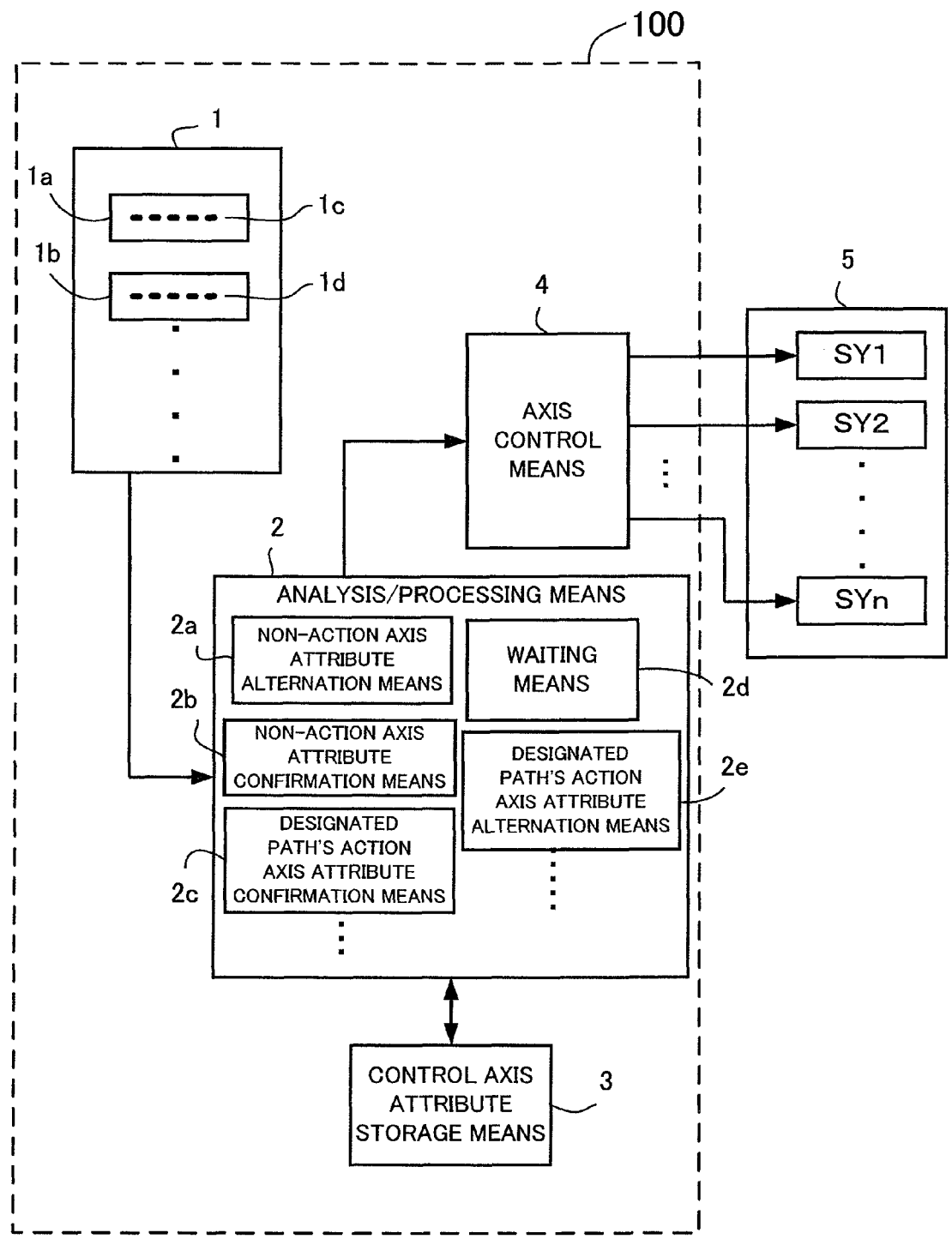
FIG. 1 is a functional block diagram showing the concept of a numerical controller according to an embodiment of this invention.

FIG. 1 is a schematic block diagram for explaining the concept of an embodiment of this invention. A numerical controller 100 includes program storage means 1, analysis/processing means 2, control axis attribute storage means 3, and axis control means 4. The embodiment of this invention differs from the prior art in that the control axis attribute storage means 3 is added as a constituent of the numerical controller. The control axis attribute storage means 3 has a function which will be described later.

The program storage means 1 stores numerical control programs (NC programs) 1a, 1b, . . . for respective paths. An axis detachment command 1c or an axis allocation command 1d is written in each of the NC programs 1a, 1b, . . . .

The analysis/processing means 2 analyzes and processes the NC programs 1a, 1b, . . . for the paths. In the embodiment of this invention, the analysis/processing means 2 includes non-action axis attribute alteration means 2a, non-action axis attribute confirmation means 2b, designated path's action axis attribute confirmation means 2c, waiting means 2d, and designated path's action axis attribute alteration means 2e. It should be noted that the non-action axis attribute alteration means 2a, the waiting means 2d, and the designated path's action axis attribute alteration means 2e are given to the analysis/processing means 2 by commands written in the NC programs for the paths.

The axis control means 4 concurrently executes the analyzed and processed NC programs to thereby control axes of respective paths SY1, SY2, . . . , SYn of a machine 5. The control axis attribute storage means 3 is storage means for storing control axis attributes of control axes for use in performing axis reconfiguration for relevant paths in accordance with the axis detachment command 1c or the axis allocation command 1d written in the NC program 1a or 1b.

Next, a description is given of axis reconfiguration for each path. The control axis attribute storage means 3 is storage means for setting two types of axis attributes (i.e., action axis attribute and non-action axis attribute) for respective axes controlled by the numerical controller, grouping non-action axes into a group (e.g., a group represented by index "0000"

described later), and managing the non-action axes group. The storage means is for use in implementing axis reconfiguration for each path. With the control axis attribute storage means 3, axis move and axis exchange can be carried out without the need for relevant paths to execute a waiting command, unlike the conventional multi-path numerical controller.

Figure 2:
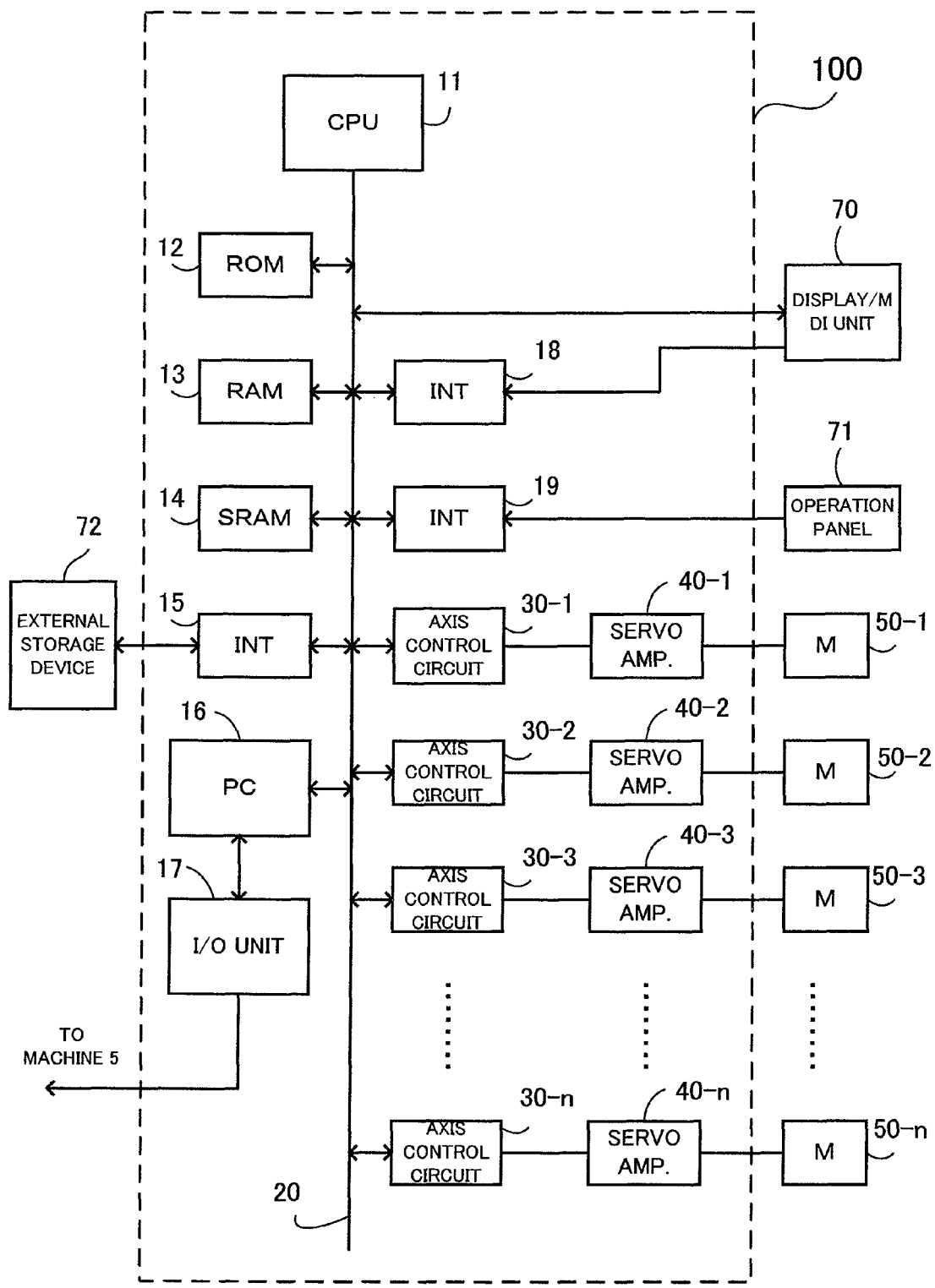
FIG. 2 is a block diagram showing essential parts of the numerical controller according to the embodiment of this invention.

FIG. 2 shows in block diagram the numerical controller 100 for controlling a plurality of paths according to this invention. A CPU 11 is a processor for controlling the entire numerical controller 100. The CPU 11 reads, via a bus 20, a system program stored in a ROM 12 and controls the entire numerical controller in accordance with the system program. A RAM 13 stores various data required for execution of functions of respective paths and input via an interface 15 or via a display/MDI unit 70, temporary calculation data, etc.

A SRAM memory 14 is backed up by a battery, not shown, and constituted as a nonvolatile memory able to retain stored contents even if the power supply to the numerical controller 100 is shut off. The SRAM memory 14 stores data individually used by each path and data commonly used by two or more paths, which are input via the interface 15 or the display/MDI unit 70, and also stores machining programs and the like. The ROM 12 is written in advance with programs for implementing memory division and memory management such as input, output, copy, and transfer of data to and from the memory and system programs for implementing a process to create and edit a machining program in an editing mode and a process for automatic operation. The interface 15 is connected with an external storage device 72 and inputs and outputs data for the paths into and from the external storage device.

A PC (programmable controller) 16 outputs signals to auxiliaries (e.g., an actuator such as a robot hand for tool exchange) of a machine tool via an I/O unit 17 in accordance with a sequence program incorporated in the numerical controller 100, thereby controlling the auxiliaries. The PC 16 receives signals from switches of an operation panel 71 installed on the machine tool body, performs desired signal processing thereon, and delivers the processed signals to the CPU 11.

The display/MDI unit 70 is a manual data input device having a display, a keyboard, etc. An interface 18 receives commands and data from the keyboard of the display/MDI unit 70 and delivers them to the CPU 11. An interface 19 is connected to the operation panel 71 and inputs various commands.

Furthermore, N axis control circuits 30-1 to 30-n are connected. Servomotors 50-1 to 50-n are connected to the axis control circuits 30-1 to 30-n via servo amplifiers 40-1 to 40-n. The servomotors 50-1 to 50-n for respective axes are provided with position/velocity detectors from which position/velocity feedback signals are fed back to the axis control circuits 30-1 to 30-n for position/velocity feedback control. It should be noted that an illustration of position/velocity feedback is omitted in FIG. 2.

Combinations of the axis control circuits, the servo amplifiers, and the servomotors each constitute one control axis. For example, one control axis is constituted by the axis control circuit 30-1, the servo amplifier 40-1, and the servomotor 50-1. Control axes are constituted by combining the other axis control circuits 30-2 to 30-n, the servo amplifiers 40-2 to 40-n, and the servomotors 50-2 to 50-n. Thus, the numerical controller 100 shown in FIG. 2 has control axes 1 to n. Identification numbers for the control axes 1 to n are set in advance, and the entire numerical controller 100 is managed using a unique number. In the below-mentioned embodiment of this invention, the identification numbers are represented by three-digit numbers, i.e., 001 to 007.

One path is constituted by one or more combinations of the control axes 1 to n, and two or more paths are set. Data for use by each of the paths and data for common use by two or more paths are set. In accordance with the set data, the CPU 11 controls each of the paths.

The above-described hardware construction and function of the numerical controller 100 are the same as and not different from those of the conventional numerical controller for controlling a plurality of paths. According to the present invention, control axis attribute storage means is provided to store, as attributes of the control axes, two types of control axis attributes, i.e., designated path's action axis attributes and non-action axis attributes. A control axis for which a designated path's action axis attribute is designated is operated in accordance with an operation command from a designated path. A control axis for which a non-action axis attribute is designated does not belong to any of the paths and cannot be operated in accordance with any of operation commands from any of the paths.

Referring to FIGS. 3a-3c, a description will be given of designated path's action axis attributes and non-action axis attributes which are set for the control axes and used in this invention. As described above, each designated path's action axis attribute represents that the relevant control axis is operable according to an operation command from a designated path. Each non-action axis attribute represents that the relevant control axis does not belong to any of the path and is not operable according to any of operation commands from any of the paths.

In the following, a description will be given of an example dual-path numerical controller 100 in which first and second paths are set as shown in FIGS. 3a-3c. For the first path, X-, Y-, Z-, and C-axes are set as control axes having designated path's action axis attributes as shown in FIG. 3a. For the second path, X-, Y-, and Z-axes are set as control axes having designated path's action axis attributes as shown in FIG. 3c. It is assumed that there is initially no control axis, which does not belong to any of the paths and has a non-action axis attribute, as shown in FIG. 3b.

For each of the control axes, pieces of data are set that represent axis names (X, Y, Z, C), four-digit attributes, and three-digit identification numbers. In each designated path's action axis attribute, the thousand's place and the hundreds place represent a path number, and the tens place and the one place represent the order in the path. For example, the attribute of 0102 represents a designation that the relevant axis operates as the second axis of the first path. For each axis, a three-digit identification number is set in advance. The identification numbers are managed by the entire numerical controller. Each non-action axis attribute includes an attribute part which is set to "0000". By setting the attribute part of non-action axis attribute to "0000", non-action axes can be managed as a group. It should be noted that the first and second path shown in FIGS. 3a to 3c have the same axis name of X. The axis names are the same as each other, but do not represent the same axis. The axis of the first path represented by the axis name of X is physically different from the axis of the second path represented by the axis name of X.

When an axis detachment command (described later) is executed for the C-axis of the first path, the C-axis becomes an axis having a non-action axis attribute as shown in FIG. 4b, and is removed from the management by the first path, but the identification number is continued to be managed. The C-axis of the first path becoming to have a non-action axis attribute is managed using the axis name C, the attribute "0000", and the identification number "004". Even if the attribute is altered from a designated path's action axis attribute to a non-action axis attribute, the identification number "004", which is a value unique to the axis, is kept unchanged. Since the axis attribute is altered to the non-action axis attribute, the designated path's action axis attributes for the first path are altered as shown in FIG. 4a. The designated path's action axis attributes for the second path are not altered.

When an axis allocation command is executed by the second path for the C-axis, the C-axis (control axis having a non-action axis attribute) becomes to have a designated path's action axis attribute (altered to an action axis of the second path) as shown in FIGS. 5a to 5c, and is under the management of the second path (FIG. 5c). Thus, alteration is made such that the C-axis operates according to a program block command from the second path. The C-axis previously having a non-action axis attribute (see FIG. 4b) is subjected to axis reconfiguration to become a designated path's action axis of the second path (see FIG. 5c), and the control axis having a non-action axis attribute disappears (see FIG. 5b).

In the following, a description will be given of "axis detachment command" and "axis allocation command". First, the axis detachment command is described.

A code of the axis detachment command is defined as G101 by parameters, and an axis to be detached is designated by an identification number that follows a P-code.

Example 1) G101P004

A command shown in the first example represents that an axis of the first path that has identification number "004", i.e., the C-axis of the first path, is to be detached (FIG. 3a). In the first example, the designated axis is designated by an identification number. Alternatively, the axis can be designated by an axis name as shown in a second example.

Example 2) G101C1

In the second example, a case where the C-axis of the first path is detached is shown.

Next, the axis allocation command is described.

A code of the axis allocation command is defined as G102 by parameters, and an axis to be allocated is designated by an identification number that follows a P-code as a first argument. Further, an axis name of a second argument designates a name of axis in a designated own path and a number that follows the axis name of the second argument designate an own path to which the axis designated by the first argument should be allocated and the order in the designated own path to which the designated axis should be allocated.

Example 3) G102P004C0204

In the first argument (P004), identification number 004 designates an axis to be confirmed whether it has a non-action axis attribute. Since the second argument C0204 starts with C, the axis name indicates the C-axis. Since attribute 0204 is designated, the relevant axis is allocated as the fourth axis in the second path. In the third example, by setting A0204 as the second argument, an A-axis can be allocated as the fourth axis in the second path. It should be noted that the first argument is designated by identification number 004 in the third example, but can be designated by an axis name.

Example 4) G102C1C0204

In the first argument C1, "1" designates the first path that includes an axis to be confirmed whether it has a non-action axis attribute, and "C" designates the C-axis. In the second argument C0204, "C" designates the C-axis as axis name, and "0204" designates that the relevant axis is allocated as the fourth axis in the second path.

(1) Example where Waiting Means at the Time of Allocation is not Executed

The first path has four axes as shown in FIG. 6a, and the second path has three axes as shown in FIG. 6b. The following first and second examples show a case where the C-axis is detached from the first path and allocated to the second path, and waiting means at the time of designated axis allocation is not executed. It is assumed that programs for the first and second paths are simultaneously operated. In other words, it is assumed that sequence number N102 in the program for the first path is executed earlier than the sequence number N203 in the program for the second path.

The following is a description of a first example program for the first path.

O0001;
N101G90G01X100Y100F1000;
N102G101P004;
N103X-100Y100;
N104X-100Y-100;
N105M30;

A program name is represented by "O0001". Sequence number N101 represents a linear motion command block, sequence number N102 represents an axis detachment command block, sequence number N103 represents a linear motion command block, sequence number N104 represents a linear motion block, and sequence number N105 represents a block specifying end of program. When axis detachment command G101 is executed in sequence number N102 for the first path, the C-axis is detached in the first path since the designated axis is represented by identification number 004. At that time, the non-action axis attribute alteration means 2a sets the attribute of the C-axis to 0000, which is a non-action axis attribute. When it is confirmed by the non-action axis attribute confirmation means 2b that the attribute of the C-axis is set to the non-action axis attribute, the first path restarts the program from the block represented by sequence number N103.

The following is a description of a second example program for the second path.

O0002;
N201G90G01X100Y100F1000;
N202X-100Y100;
N203G102P004C0204;
N204C100;
N205M30;

A program name is represented by "O0002". Sequence number N201 represents a linear motion command block, sequence number N202 represents a linear motion block, sequence number N203 represents an axis allocation command block, sequence number N204 represents a rotational motion command block, and sequence number N205 represents a block specifying end of program. After the block represented by sequence number N102 is executed in the first path, axis allocation command G102 in sequence number N203 is executed in the second path. Since the identification number for the designated axis is 004 in the first argument, the non-action axis attribute confirmation means 2b confirms whether the attribute of the C-axis becomes equal to 0000 (non-action axis attribute). If it is confirmed that the non-action axis attribute is 0000, the designated path's action axis attribute alteration means 2e sets designated path's action axis attribute 0204 as the attribute of the fourth axis of the second path and an axis name is allocated to the C-axis, since the designated axis allocation position is C0204 in the second argument. If it is confirmed by the designated path's action axis attribute confirmation means 2c that designated path's action axis attribute is set for the second path, the program is restarted from the block represented by sequence number N204. Axis configurations of the first and second paths after the programs being executed by the first and second paths are shown in FIGS. 7a and 7b.

(2) Example where Waiting Means at the Time of Designated Axis Allocation is Executed The following third and fourth example programs are cases where the C-axis is detached from the first path and allocated to the second path, and waiting means at the time of designated axis allocation is executed. It is assumed that programs for the first and second paths are simultaneously operated. In this example, sequence number N202 for the second path is executed earlier than sequence number N103 for the first path.

The third example program for the first path is described.
O0003;
N101G90G01X100Y100F1000;
N102X-100Y100;
N103G101P004;
N104X-100Y-100;
N105M30;

A program name is represented by "O0003". Sequence numbers N101 and N102 each represent a linear motion command block, sequence number N103 represents an axis detachment command block, sequence number N104 represents a linear motion block, and sequence number N105 represents a block indicating end of program. When axis detachment command G101 is executed in sequence number N103 for the first path, the C-axis of the first path is detached since the designated axis is represented by identification number 004. At that time, the non-action axis attribute alteration means 2a sets the attribute of the C-axis to 0000 which is a non-action axis attribute. When it is confirmed by the non-action axis attribute confirmation means 2b that the attribute of the C-axis is set to the non-action axis attribute, the first path restarts the program from the block represented by sequence number N104.

Next, the fourth example program for the second path is described.
O0004;
N201G90G01X100Y100F1000;
N202G102P004C0204;
N203X-100Y100;
N204C100;
N205M30;

A program name is represented by "O0004". Sequence number N201 represents a linear motion command block, sequence number N202 represents an axis allocation command block, sequence number N203 represents a linear motion block, sequence number N204 represents a rotational motion command block, and sequence number N205 represents a block indicating end of program.

Axis allocation command G102 in sequence number N202 for the second path is executed earlier than the block corresponding to sequence number N103 for the first path. Since a designated axis in the first argument has identification number 004, the C-axis is designated.

The non-action axis attribute confirmation means 2b is executed to confirm whether the attribute of the C-axis is set to 0000, which is a non-action axis attribute. If it is confirmed that the attribute of the C-axis is not set to the non-action axis attribute, waiting means 2d at the time of designated axis allocation is executed to make a wait, by an axis allocation command, until the non-action axis attribute is set. The non-action axis attribute confirmation means 2b is regularly executed from the waiting means 2d at the time of designated axis allocation, to make a wait by the axis allocation command in sequence number N202 until the attribute of the C-axis is set to 0000 (non-action axis attribute). By using the waiting means 2d at the time of designated axis allocation which is internally executed, it is unnecessary to write into the program a waiting command block, unlike the prior art. Since waiting is activated by the axis allocation command, the processing time can be shortened by one program block.

In the third example program, axis detachment command G101 in sequence number N103 for the first path is executed later than the sequence number N202 for the second path. Since the designated axis is represented by identification number 004, the C-axis of the first path is detached.

At that time, the non-action axis attribute alteration means 2a sets the attribute of the C-axis to 0000 (non-action axis attribute). When it is determined by the non-action axis attribute confirmation means 2b, which confirms whether non-action axis attribute 0000 is set to the axis designated to be detached, that non-action axis attribute 0000 is set, the first path restarts the remaining of the program from sequence number N104. The axis configuration after reconfiguration is shown in FIGS. 8a and 8b.

Next, an axis exchange command is described. A code of the axis exchange command is parameter set to G103. It is assumed that axis configurations of the paths are ones shown in FIGS. 9a and 9b. An axis to be exchanged in own path is designated by an identification number in the first argument which follows a P-code, and an axis to be exchanged in a counterpart axis is designated by an identification number in the second argument which follows a Q-code. The exchange command is designated by each of the two paths having the axis to be exchanged.

Fifth Example) G103P001Q004

In the fifth example, G103 includes a first argument for detaching an axis designated by identification number 001 and a second argument for allocating an axis designated by identification number 004 to a position from which the axis to be detached is detached. To alter the axis name and the axis allocation position, a third argument can be designated as shown in a sixth example.

Sixth Example) G103P001Q004Y1

In the sixth example where the third argument is Y1, if axis name X is designated by the first argument, the axis name is altered to Y after exchange and allocation is made to the first axis of the path.

Seventh Example) G103X1Y2

The seventh example is an example where the first and second arguments are designated using axis names. With the first argument X1, the first path is represented by "1" and the X-axis is represented by "X". Thus, the X-axis of the first path is designated. With the second argument Y2, the second path is represented by "2" and the Y-axis is represented by "Y".

Thus, the Y-axis of the second path is designated. As with the sixth example, the axis name can be altered by designating a third argument.

Next, an axis exchange command is described based on fifth and sixth example programs. It is assumed that axis configurations of the first and second paths are ones shown in FIGS. 9a and 9b. As example programs for the first and second paths including an axis exchange command, "O0005" and "O0006" are shown.

The fifth example program for the first path is described.
O0005;
N101G90001X100F1000;
N102G103P001Q004;
N103Y-100;
N104Y-200;
N105M30;

The sixth example program for the second path is described.
O0006;
N201G90G01Y100F1000;
N202G103P004Q001;
N203X-100;
N204X-200;
N205M30;

The programs "O0005" and "O0006" for the first and second paths are simultaneously operated. In each path, the attribute of an axis to be detached in the own path, which is designated by an argument in an axis exchange command, is set to 0000 (non-action axis attribute). In the programs "O0005" and "O0006", the attribute of the X-axis of the first path designated by identification number 001 and the attribute of the Y-axis of the second path designated by identification number 004 are each set to a non-action axis attribute.

Next, the non-action axis attribute confirmation means 2b confirms whether the attribute of the axis to be allocated, which is designated by the second argument in the axis exchanged command for each path, is set to 0000 (non-action axis attribute).

i) In a case where it is confirmed that the attribute is set to the non-action axis attribute, the designated path's action axis attribute alteration means 2e alters the attribute of the axis to be allocated, which is designated by the axis exchange command, to a designated path's action axis attribute of the own path. In the programs "O0005" and "O0006", the first path alters the attribute of the Y-axis designated by identification number 004 to 0101, and the second path alters the attribute of the X-axis designated by identification number 001 to 0201.

ii) In a case where it is confirmed that the attribute is not set to the non-action axis attribute, the waiting means 2d at the time of designated axis exchange for making a wait by a designated axis exchange command is executed until the attribute of the axis to be allocated is set to 0000 (non-action axis attribute), the non-action axis attribute confirmation means 2b is regularly executed from the waiting means 2d at the time of designated axis exchange, and the attribute alteration described in i) is carried out when it is determined that the attribute of the axis to be allocated is set to 0000 (non-action axis attribute). After execution of the attribute alteration, the designated path's action axis attribute confirmation means 2c is executed, and the path for which it is confirmed that the designated attribute is set restarts the program from a block next to the designated axis exchange command. The first path restarts the remaining of the program from the next sequence number N103, and the second path restarts the remaining of the program from the next sequence number N203. The axis configurations of the first and second paths after reconfiguration are shown in FIGS. 10a and 10b.

Figure 11:
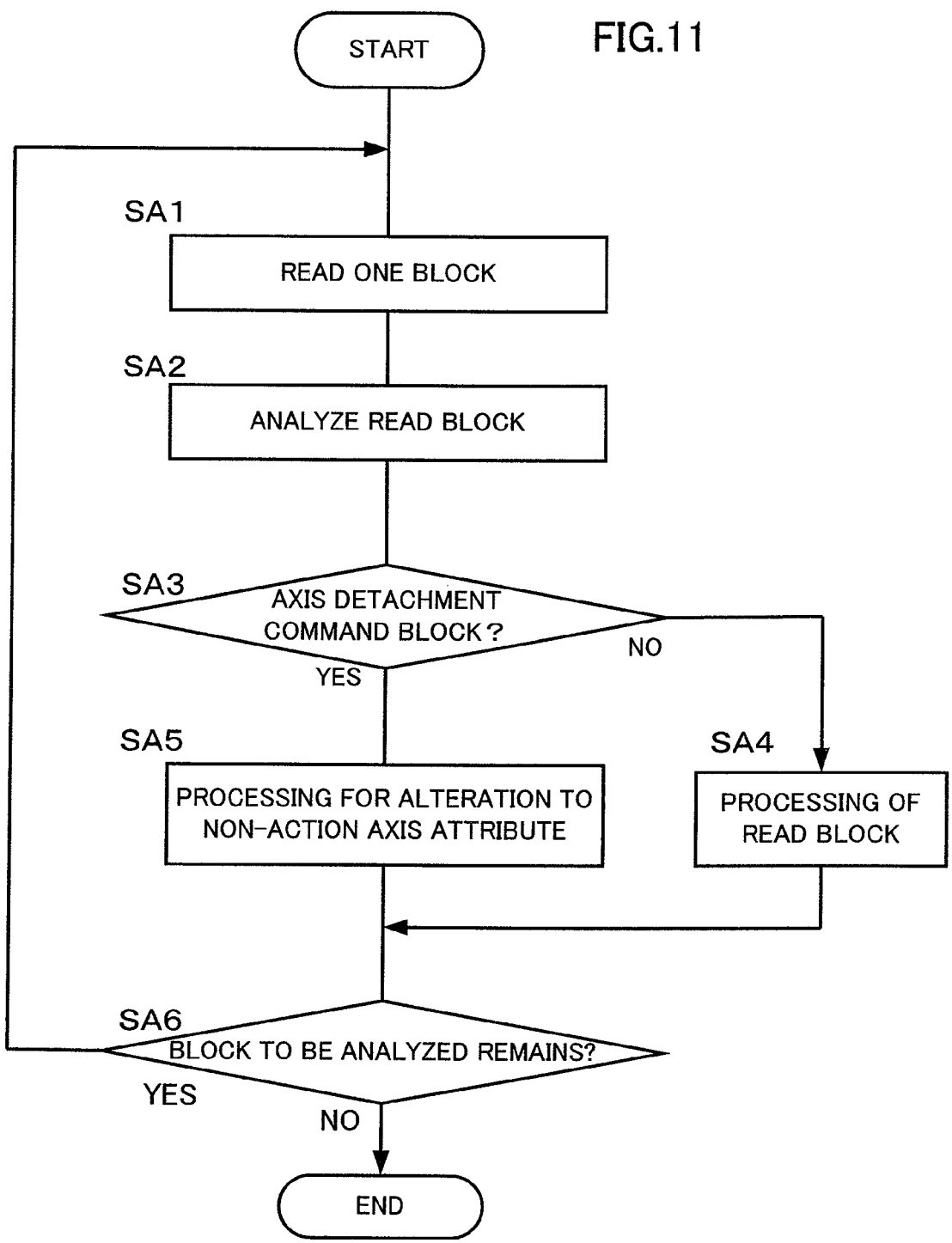
FIG. 11 is a flowchart showing an algorithm of a process for a case where a program including a process for altering a designated path's action axis attribute to a non-action axis attribute is executed.

FIG. 11 show in flowchart an algorithm of a process for a case where a program including a process for altering a designated path's action axis attribute to a non-action axis attribute is executed in a given path. In the following, a description is given of respective steps.

[Step SA1] A program block is read, and the procedure proceeds to Step SA2.

[Step SA2] The block read in Step SA1 is analyzed, and the procedure proceeds to Step SA3. In analyzing the block, the program block is divided into alphabetic symbols and numeral symbols, the meaning of a combination of the commanded alphabetic symbols and numeric characters is determined, a function of the commanded alphabetic symbols and numeric characters is identified, and function group information is prepared. The analysis is a process ordinarily executed by the numerical controller.

[Step SA3] It is determined whether the block analyzed in Step SA2 is an axis detachment command block. If the block is the axis detachment command block, the procedure proceeds to Step SA5. If the block is not the axis detachment command block, the procedure proceeds to Step SA4.

[Step SA4] A block other than the axis detachment command block is processed, and the procedure proceeds to Step SA6.

[Step SA5] Processing to alter a designated path's action axis attribute of the axis designated by the axis detachment command to a non-action axis attribute is executed, and the procedure proceeds to Step SA6.

[Step SA6] It is determined whether there remains a block to be analyzed. If there is no block to be analyzed, the procedure is completed. If there is a block to be analyzed, the flow returns to Step SA1 to continue the procedure.

Figure 12:
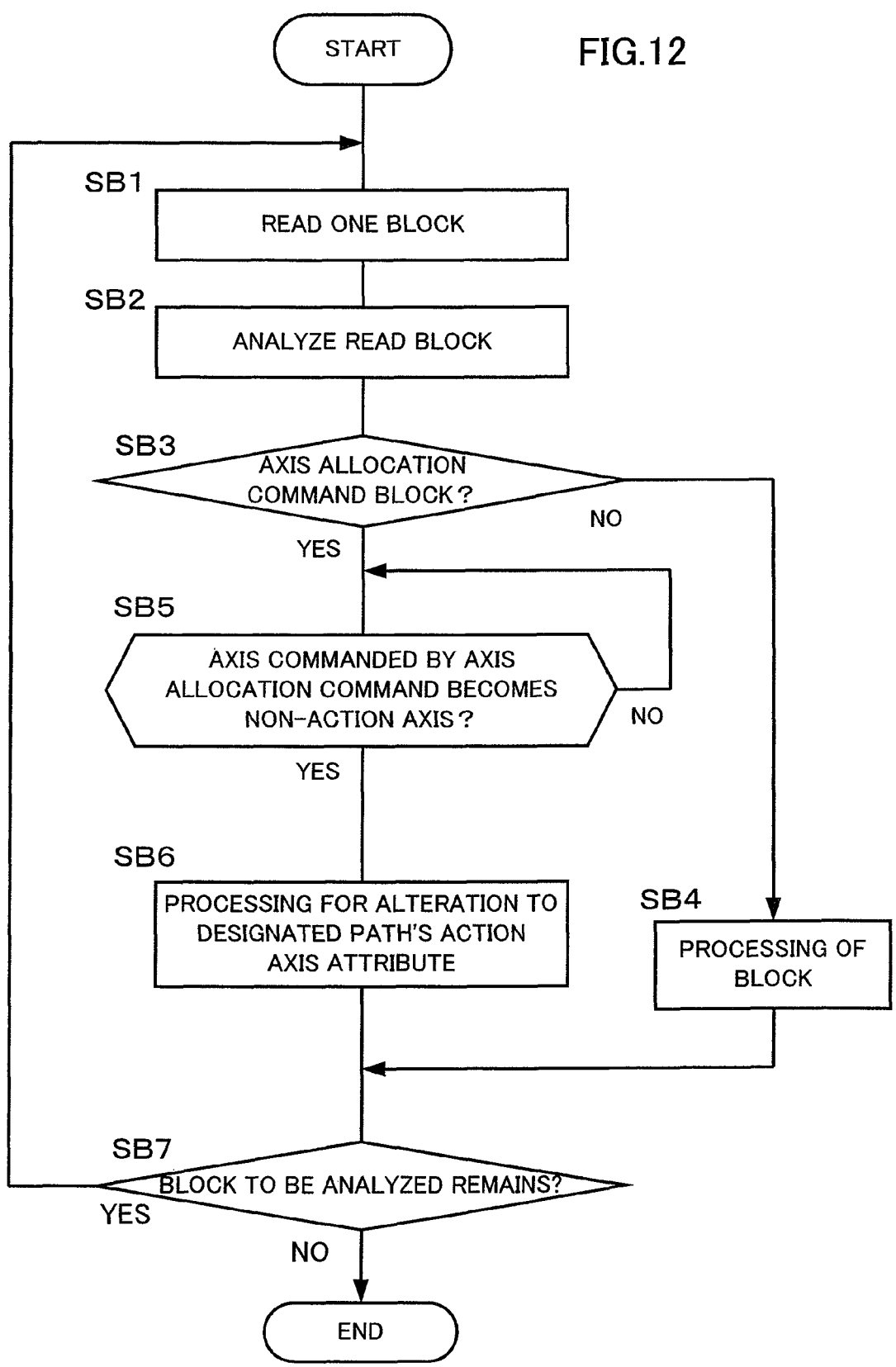
FIG. 12 is a flowchart showing an algorithm of a process for a case where a program including an axis allocation command for allocating a control axis designated from a given path is executed.

FIG. 12 shows in flowchart an algorithm of a process for a case where a program including an axis allocation command for allocating a control axis designated from a given path is executed. In the following, a description is given of respective steps.

[Step SB1] A program block is read, and the procedure proceeds to Step SB2.

[Step SB2] The block read in Step SB1 is analyzed, and the procedure proceeds to Step SB3.

[Step SB3] It is determined whether the block analyzed in Step SB2 is an axis allocation command block. If the block is the axis allocation command block, the procedure proceeds to Step SB5. If the block is not the axis allocation command block, the procedure proceeds to Step SB4.

[Step SB4] A block other than the axis allocation command block is processed, and the procedure proceeds to Step SB7.

[Step SB5] It is determined whether the control axis designated by the axis allocation command becomes to have a non-action axis attribute. If the control axis designated by the axis allocation command has not the non-action axis attribute, the procedure waits until the control axis becomes to have the non-action axis attribute. If the control axis has the non-action axis attribute, the procedure proceeds to Step SB6.

[Step SB6] Processing for alteration to a designated path's action axis attribute is executed, and the procedure proceeds to Step SB7.

[Step SB7] It is determined whether there remains a block to be analyzed. If there is no block to be analyzed, the procedure is completed. If there is a block to be analyzed, the procedure returns to Step SB1 to continue the procedure.

Figure 13:
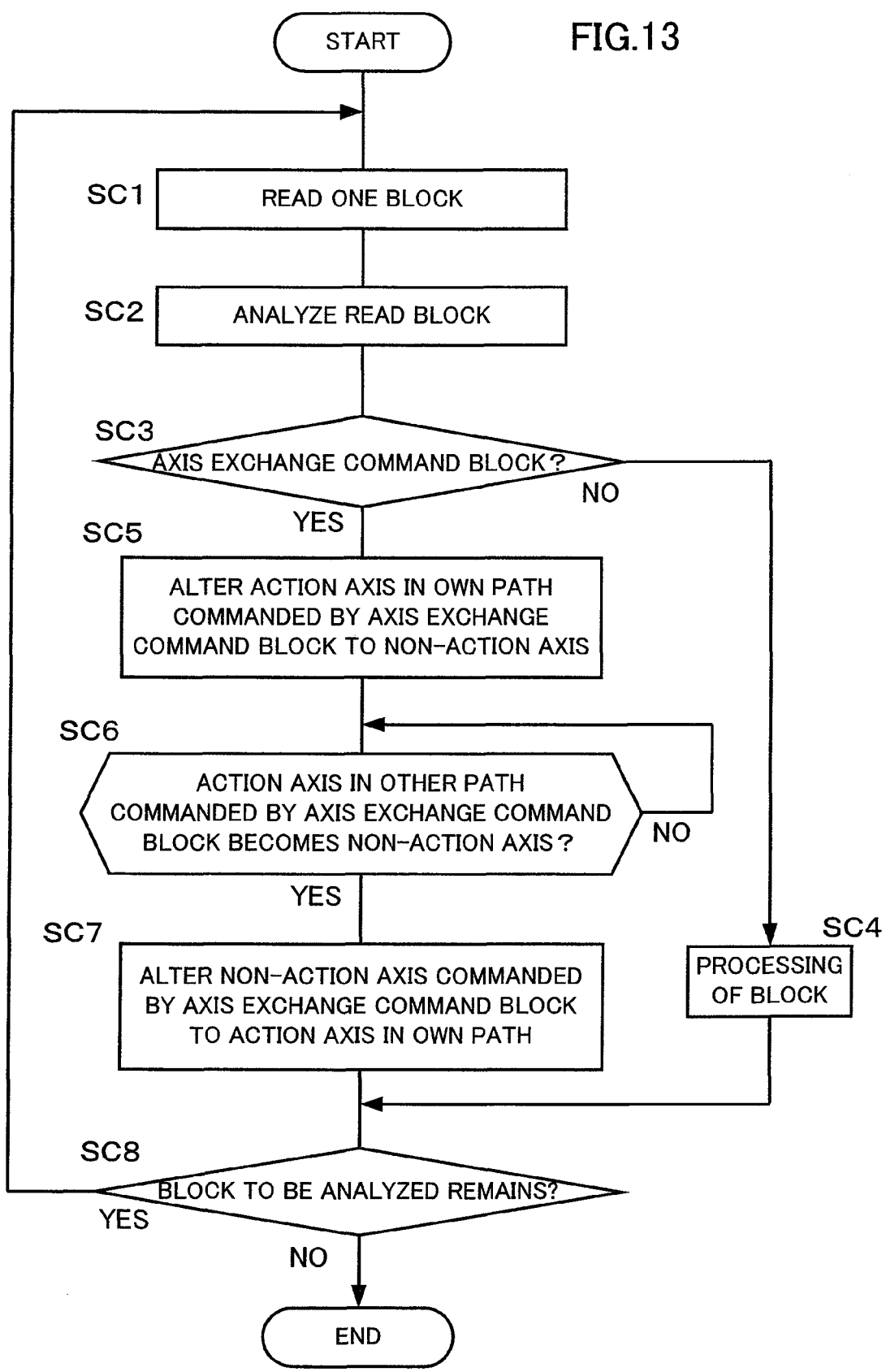
FIG. 13 is a flowchart showing an algorithm of a process for a case where a program including an axis control command for designating control axes in own path and another path and exchanging the control axes is executed.

FIG. 13 shows in flowchart an algorithm of a process for a case where a program including an axis control command for designating control axes in own path and another path and exchanging the control axes is executed. In the following, a description is given of respective steps.

[Step SC1] A program block is read, and the procedure proceeds to Step SC2.

[Step SC2] The block read in Step SC1 is analyzed, and the procedure proceeds to Step SC3.

[Step SC3] It is determined whether the block is an axis exchange command block. If the block is not the axis exchange command block, the procedure proceeds to Step SC4. If the block is the axis exchange command block, the procedure proceeds to Step SC5.

[Step SC4] A block other than the axis exchange command block is processed, and the procedure proceeds to Step SC8.

[Step SC5] Processing is executed for altering an action axis attribute of an axis in the own path designated by the axis exchange command block to a non-action axis attribute, and the procedure proceeds to Step SC6.

[Step SC6] It is determined whether an action axis attribute of an axis in other path designated by the axis exchange command block is altered to a non-action axis attribute. If the axis is not altered to the non-action axis, waiting is made until the axis is altered to the non-action axis, and the procedure proceeds to Step SC7.

[Step SC7] The non-action axis attribute of the axis designated by the axis exchange command block is altered to an action axis attribute in the own path, and the procedure proceeds to Step SC8.

[Step SC8] It is determined whether there remains a block to be analyzed. If there is a block to be analyzed, the procedure proceeds to Step SC1. If there is no block to be analyzed, the procedure is completed.

Figure 14:
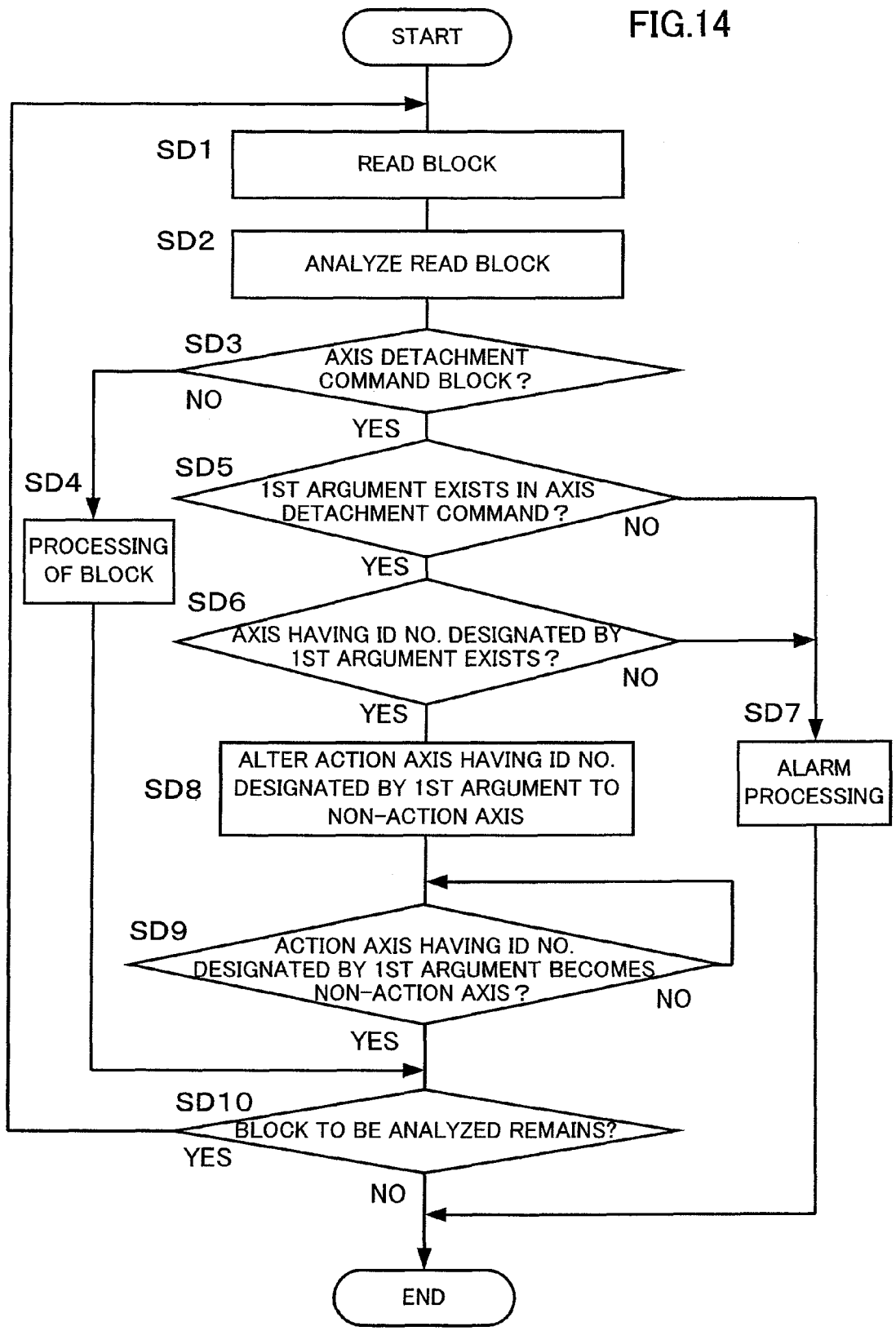
FIG. 14 is a flowchart showing an algorithm of a process for a case where alarm processing, etc. are included in the flowchart of FIG. 11 showing an algorithm of a process for executing a program including a process for altering a designated path's action axis attribute to a non-action axis attribute.

Next, a description is given of a flowchart of FIG. 14 showing an algorithm of a process including alarm processing, etc. The flowchart of FIG. 14 includes alarm processing and processing to confirm whether the axis is altered so as to have a non-action axis attribute as well as the process shown in the flowchart of FIG. 11. In the following, a description is given of respective steps.

[Step SD1] A program block is read, and the procedure proceeds to Step SD2.

[Step SD2] The block read in Step SD1 is analyzed, and the procedure proceeds to Step SD3.

[Step SD3] It is determined whether the block analyzed in Step SD2 is an axis detachment command block. If the block is the axis detachment command block, the procedure proceeds to Step SD5. If the block is not the axis detachment command block, the procedure proceeds to Step SD4.

[Step SD4] A block other than the axis detachment command block is processed, and the procedure proceeds to Step SD10.

[Step SD5] It is determined whether there is a first argument in the axis detachment command. If there is no first argument, the procedure proceeds to Step SD7. If there is the first argument, the procedure proceeds to Step SD6.

[Step SD6] It is determined whether there is an axis having an identification number designated by the first argument. If there is no such axis, the procedure proceeds to Step SD7. If there is such an axis, the procedure proceeds to Step SD8.

[Step SD7] Alarm processing is executed, and the procedure is completed. As the alarm processing, an occurrence of abnormality in an axis detachment process is displayed on display means of the numerical controller 100, for instance.

[Step SD8] The action axis having the identification number designated by the first argument is altered to a non-action axis, and the procedure proceeds to Step SD9.

[Step SD9] It is determined whether the action axis having the identification number designated by the first argument becomes a non-action axis. The procedure waits until the axis having the identification number designated by the first argument becomes the non-action axis, and proceeds to Step SD10.

[Step SD10] It is determined whether there remains a block to be analyzed. If there is a block, the procedure returns to Step SD1 to continue the procedure. If there is no block to be analyzed, the procedure is completed.

Figure 15:
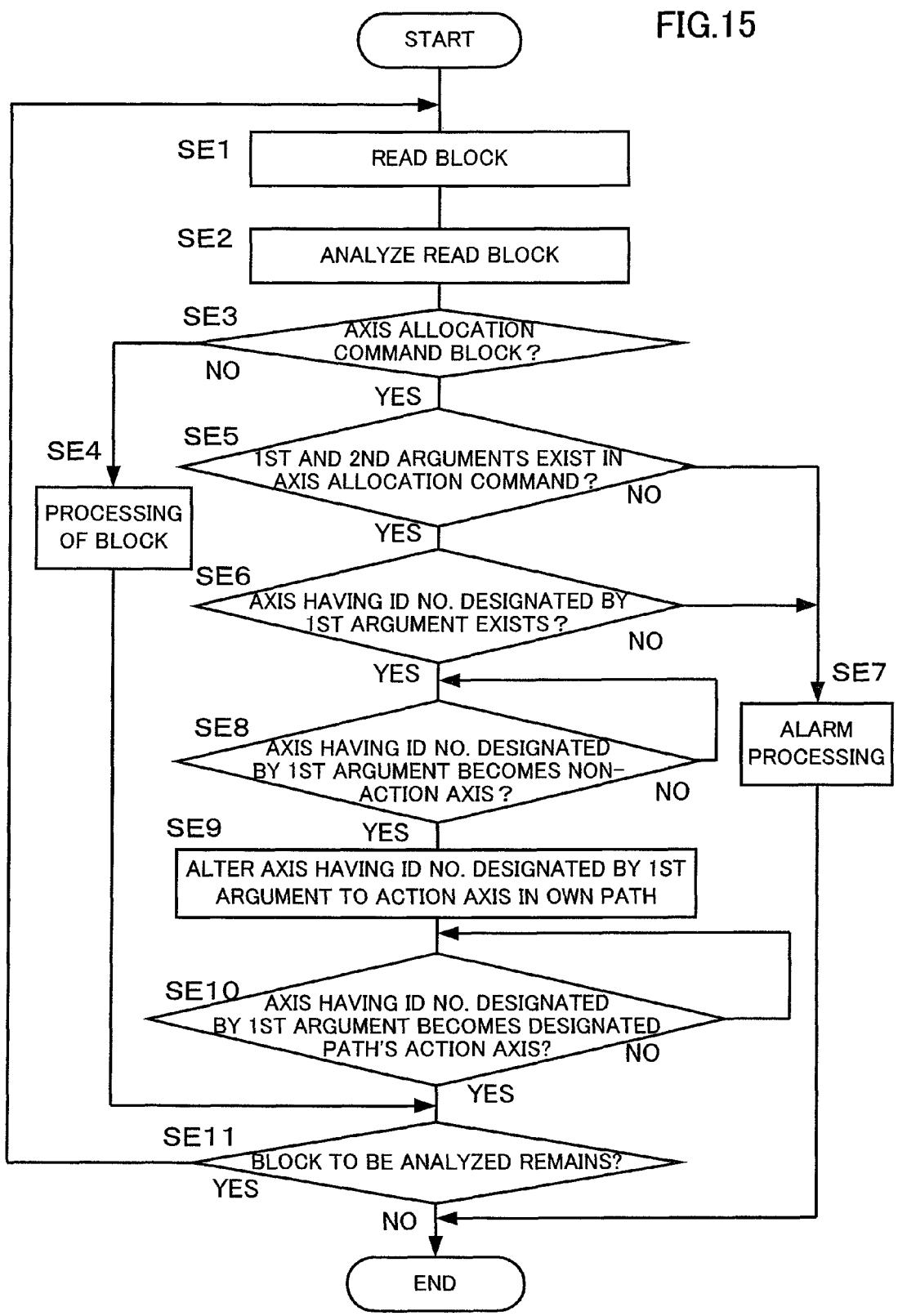
FIG. 15 is a flowchart showing an algorithm of a process for a case where alarm processing, etc. are included in the flowchart of in FIG. 12 showing an algorithm of a process for executing a program including an axis allocation command for allocating a control axis designated from a given path.

Next, a flowchart of algorithm shown in FIG. 15 is described. The flowchart of FIG. 15 includes a process including alarm processing, etc. as well as the process shown in the flowchart of FIG. 12 for a case where a program containing an axis allocation command for allocating a control axis designated from a given path is executed.

[Step SE1] A program block is read, and the procedure proceeds to Step SE2.

[Step SE2] The block read in Step SE1 is analyzed, and the procedure proceeds to Step SE3.

[Step SE3] It is determined whether the block analyzed in Step SE2 is an axis allocation command block. If the block is the axis allocation command block, the procedure proceeds to Step SE5. If the block is not the axis allocation command block, the procedure proceeds to Step SE4.

[Step SE4] A block other than the axis allocation command block is processed, and the procedure proceeds to Step SE11.

[Step SE5] It is determined whether there are first and second arguments in the axis allocation command. If there are no arguments, the procedure proceeds to Step SE7. If there are the arguments, the procedure proceeds to Step SE6.

[Step SE6] It is determined whether there is an axis having an identification number designated by the first argument. If there is no such axis, the procedure proceeds to Step SE7. If there is such an axis, the procedure proceeds to Step SE8.

[Step SE7] Alarm processing is executed, and the procedure is completed. As the alarm processing, an occurrence of abnormality in an axis detachment process is displayed on display means of the numerical controller 100, for instance.

[Step SE8] It is determined whether the axis having the identification number designated by the first argument of the axis allocation command becomes a non-action axis. The procedure makes a wait until the axis having the identification number designated by the first argument of the axis allocation command becomes the non-action axis, and proceeds to Step SE9. It should be noted that whether the axis becomes to have the non-action axis attribute can be determined by confirming the stored content of the control axis attribute storage means 3 (see FIG. 1).

[Step SE9] The attribute of the axis having the identified number designated by the first argument is altered to a designated action axis attribute in the own path, and the procedure proceeds to Step SE10.

[Step SE10] It is determined whether the axis having the identification number designated by the first argument becomes the designated path's action axis. The procedure make a wait until the axis having the identified number designated by the first argument becomes the designated path's action axis, and proceeds to Step SE11.

[Step SE11] It is determined whether there remains a block to be analyzed. If there is a block, the procedure returns to Step SE1 to continue the procedure. If there is no block to be analyzed, the procedure is completed.

Figure 16:
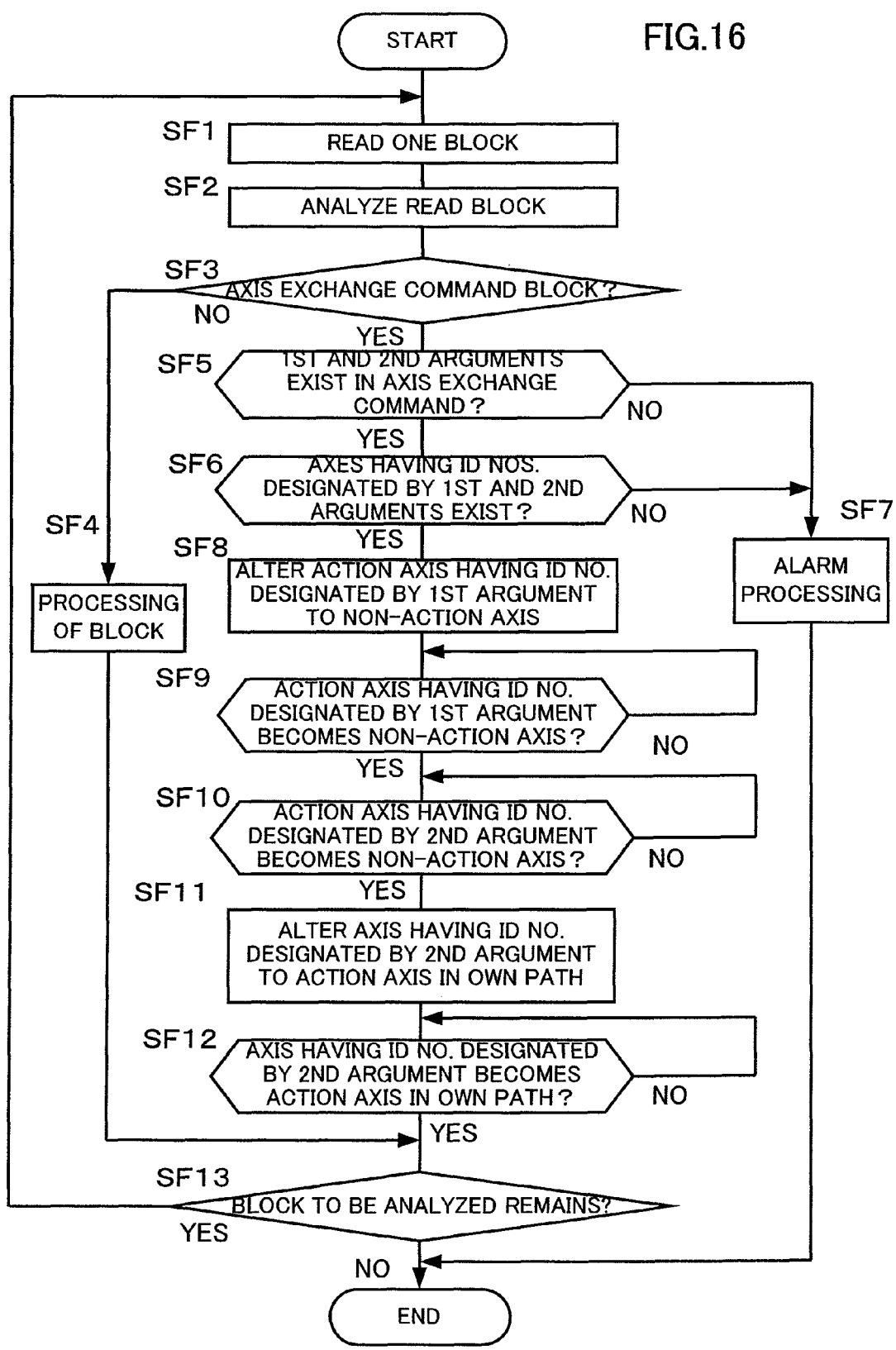
FIG. 16 is a flowchart showing an algorithm of a process for a case where alarm processing, etc. are included in the flowchart of FIG. 13 showing an algorithm of a process for executing a program including an axis control command for designating control axes in own path and another path and exchanging the control axes.

Next, the algorithm flowchart shown in FIG. 16 is described. The flowchart shown in FIG. 16 includes a process of alarm processing, etc. as well as the process shown in the flowchart of FIG. 13 in which a program containing an axis exchange command for designating control axes in the own path and other path and exchanging the control axes is executed.

[Step SF1] A block of program is read, and the procedure proceeds to Step SF2.

[Step SF2] The block read in Step SF1 is analyzed, and the procedure proceeds to Step SF3.

[Step SF3] Whether the block analyzed in Step SF2 is an axis exchange command block is determined. If the analyzed block is not the axis exchange command block, the procedure proceeds to Step SF4. If the block is the axis exchange command block, the procedure proceeds to Step SF5.

[Step SF4] A block other than the axis exchange command block is processed, and the procedure proceeds to Step SF13.

[Step SF5] Whether there are first and second arguments in the axis exchange command is determined. If there are no such arguments, the procedure proceeds to Step SF7. If there are such arguments, the procedure proceeds to Step SF6.

[Step SF6] It is determined whether there are axes having identification numbers designated by the first and second arguments. If such axes are not present, the procedure proceeds to Step SF7. If there are such axes, the procedure proceeds to Step SF8.

[Step SF7] Alarm processing is executed, and the procedure is completed. As the alarm processing, an occurrence of abnormality in an axis exchange process is displayed on display means of the numerical controller 100, for instance.

[Step SF8] The action axis having identification number designated by the first argument is altered to a non-action axis, and the procedure proceeds to Step SF9.

[Step SF9] It is determined whether the action axis having the identification number designated by the first argument becomes the non-action axis. When the axis having the identification number designated by the first argument becomes the non-action axis, the procedure proceeds to Step SF10.

[Step SF10] It is determined whether the axis having the identification number designated by the second argument becomes a non-action axis. If the axis having the identification number designated by the second argument becomes the non-action axis, the procedure proceeds to Step SF11.

[Step SF11] The attribute of the axis having the identification number designated by the second argument is altered to a designated path's action axis attribute in own path, and the procedure proceeds to Step SF12.

[Step SF12] It is determined whether the attribute of the axis in the other path having the identification number designated by the second argument of the axis exchange command becomes a designated action axis attribute in the own path. When the axis becomes to have the designated path's action axis attribute, the procedure proceeds to Step SF13.

[Step SF13] It is determined whether there remains a block to be analyzed. If there is a block, the procedure returns to Step SF1 to continue the procedure. If there is no block to be analyzed, the procedure is completed.

As described above, in a case for example that axes are moved between the two paths (the first and second paths), this invention executes, as a first step, an axis detachment command for designating an axis from the first path and detaching the designated axis. By executing the command, the attribute of the designated axis is altered from a designated path's action axis attribute to a non-action axis attribute. When the axis detachment command is completed, the first path is able to execute the next program command without executing a waiting command.

As a second step, an axis allocation command for designating and allocating an axis by the second path is executed, to thereby confirm whether the designated axis has a non-action axis attribute. If the axis has the non-action axis attribute, the attribute is altered to a designated path's action axis attribute, and the allocated axis is reconfigured as a designated path's action axis, whereby the axis move from the first path to the second path is completed.

If the axis designated by an axis allocation command does not become to have the non-action axis attribute, processing to wait until the axis designated by axis allocation command becomes to have the non-action axis attribute is executed by the second path. As a result, it is unnecessary to make a wait between the paths, and the function of axis reconfiguration can be realized without using a waiting command between the paths in which an axis detachment command, an axis allocation command, or an axis exchange command is executed.

What is claimed is:

1. A numerical controller having at least two paths for controlling control axes and having a function of altering an axis configuration of the control axes in the paths according to commands in programs respective for the paths, said numerical controller comprising:

control axis attribute storage means arranged to store attributes of the control axis to be a designated path's action axis attribute for a control axis belonging to and being operable in any of the paths, and to be a non-action axis attribute for a control axis not belonging to any of the paths;

determining means arranged to analyze a block of the program for one of the paths to determine whether or not the block includes a control axis detachment command for commanding detachment of control of a control axis from the one of the paths; and non-action axis attribute alteration means arranged to alter the action axis attribute of the control axis designated by the control axis detachment command to the non-action axis attribute and store the non-action axis attribute of the control axis in said control axis attribute storage means when it is determined that the block includes the control axis detachment command by said determining means.

2. A numerical controller having at least two paths for controlling control axes and having a function of altering an axis configuration of the control axes in the paths according to commands in programs respective for the paths, said numerical controller comprising:

control-axis attribute storage means arranged to store attributes of the control axes to be a designated path's action axis attribute for a control axis belonging to and being operable in any of the paths, and to be a non-action axis attribute for a control axis not belonging to any of the paths;

determining means arranged to analyze a block of the program for one of the paths to determine whether or not the block includes an axis allocation command for allocating control of a control axis in the one of the paths;

non-action axis attribute determining means arranged to determine whether or not the control axis designated by the axis allocation command has the non-action axis attribute; and designated path's action axis attribute alteration means arranged to alter the non-action axis attribute of the control axis designated by the axis allocation command to the designated path's action axis attribute in the one of the paths, and store the designated path's action axis attribute of the control axis in said control axis attribute storage means when it is determined that the block includes the allocation command and it is determined that the control axis has the non-action axis attribute.

3. A numerical controller having at least two paths for controlling control axes and having a function of exchanging the control axes among the at least two paths according to commands in programs corresponding to each of the at least two paths, said numerical controller comprising:

control-axis attribute storage means arranged to store attributes of the control axes to be a designated path's action axis attribute for a control axis belonging to and being operable in one of the paths, and to be a non-action axis attribute for a control axis not belonging to any of the paths;

determining means arranged to analyze a block in the program corresponding to each of the at least two paths and determine whether the block includes an axis exchange command for exchanging control of a first control axis of own path and control of a second control axis of other path;

non-action axis attribute alteration means arranged to alter the action axis attribute of the first control axis in the own path to the non-action axis attribute, and store the non-action axis attribute of the first control axis in said control axis attribute storage means when it is determined that the block includes the control axes exchange command;

non-action axis attribute confirmation means arranged to confirm whether or not the second control axis designated by the axis exchange command in the block has the non-action axis attribute;

waiting means that waits until the second control axis becomes to have the non-action axis attribute when it is confirmed by the non-action attribute confirmation means that the second axis designated by the axis exchange command does not have the non-action axis attribute; and designated path's action axis attribute alteration means arranged to alter the non-action axis attribute of the second control axis to the designated path's control axis attribute in the own path, and store the designated path's control axis attribute of the second control axis in said control axis attribute storage means when it is confirmed by the non-action attribute confirmation means that the second control axis has the non-action axis attribute.

* * * * *